US006658969B2

(12) United States Patent
Jones

(10) Patent No.: US 6,658,969 B2
(45) Date of Patent: Dec. 9, 2003

(54) TOOL FOR SECURING THREADED INSERTS

(76) Inventor: James R. Jones, 801 McCain Rd., Rogers, AR (US) 72758

(*) Notice: Subject to any disclaimer, the term of this patent is extended or adjusted under 35 U.S.C. 154(b) by 0 days.

(21) Appl. No.: 09/964,188

(22) Filed: Sep. 25, 2001

(65) Prior Publication Data

US 2002/0035896 A1 Mar. 28, 2002

Related U.S. Application Data

(60) Provisional application No. 60/235,571, filed on Sep. 27, 2000.

(51) Int. Cl.[7] .......... F16B 21/00

(52) U.S. Cl. .......... 81/53.2; 81/9.24; 81/54; 411/29; 411/43

(58) Field of Search .......... 81/53.2, 54, 9.24; 29/526; 411/43, 34, 70, 39, 41, 501

(56) References Cited

U.S. PATENT DOCUMENTS

| | | | | | |
|---|---|---|---|---|---|
| 3,453,927 | A | * | 7/1969 | Moore | 411/29 |
| 5,183,357 | A | * | 2/1993 | Palm | 411/29 |
| 5,195,855 | A | * | 3/1993 | Atkinson et al. | 411/43 |
| 5,209,621 | A | * | 5/1993 | Burbidge | 411/340 |
| 5,618,142 | A | * | 4/1997 | Sonden et al. | 411/29 |
| 5,741,099 | A | * | 4/1998 | Aasgaard | 411/29 |
| 5,915,901 | A | * | 6/1999 | Aasgaard | 411/29 |

* cited by examiner

*Primary Examiner*—Joseph J. Hail, III
*Assistant Examiner*—Anthony Ojini
(74) *Attorney, Agent, or Firm*—Head, Johnson and Kachigian

(57) ABSTRACT

A device and method for inserting rivets. The device and method allows for accurate, consistent installation of threaded blind rivets. The device comprises a rivet insert tool, a rivet insert shaft, and a sleeve through which the shaft passes. This provides significant accuracy to less accurate rivet inserting devices.

9 Claims, 8 Drawing Sheets

Fig. 3a
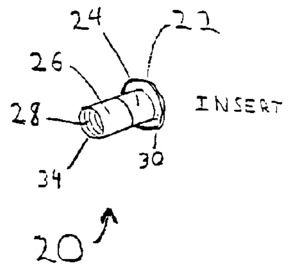
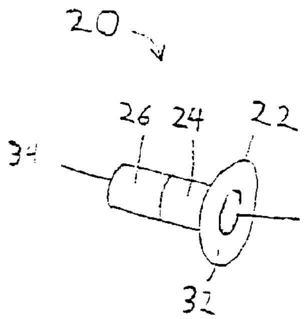
Fig. 3b

TOOL FOR SECURING THREADED INSERTS

CROSS REFERENCE TO RELATED APPLICATIONS

This application claims priority to and is a continuation-in-part of U.S. provisional application Ser. No. 60/235,571, filed Sep. 27, 2000.

BACKGROUND OF THE INVENTION

1. Field of the Invention

The present invention discloses a tool for securing threaded inserts. More specifically, the present invention discloses a tool and method for accurately and consistently placing threaded rivet inserts into holes in metal or other material designed to receive the inserts. The present invention discloses a threaded shaft used in conjunction with a sleeve that provides consistency and accuracy.

2. Prior Art

Rivets have become common in all manufacturing industries. They have come to serve more than one function. Rivets are often used to hold two or more pieces of sheet metal or other material together but serve other functions as well. Rivets are generally cylindrical having a flanged end. The cylindrical insert portion of the rivet is placed within a hole designed to receive the rivet insert. A tool is then used to form a flange on the opposite side of the hole from the pre-existing flange. These flanges form collars on either side of the hole into which the rivet is inserted. The collars hold the rivet in place and can hold two or more pieces of sheet metal or other similar flat material together when captivated between the collars.

While some rivets do not have a hollow interior of the cylindrical portion, others do. Many rivets are designed so that a hollow cylindrical insert portion is threaded on the inside. This threading allows screws and bolts to be attached to the rivet after it is in place. These threaded rivets have become common, especially in the automotive industry. They may be used in conjunction with bolts screws and other threaded shafts to attach a variety of materials to the sheet metal from which automobile bodies are typically formed. Those skilled in the art of auto body manufacture, assembly and repair are very familiar with threaded rivets.

A blind threaded rivet has a flanged head, a thin, walled sleeve portion and a nut and is designed to be inserted into an opening in a wall or sheet. The advantage of blind rivets is that access to only one side of the opening in the wall or sheet is necessary. Fixing of a blind rivet is accomplished by deforming the sleeve portion to a bulge so that the wall or sheet is clamped between the head and bulge or flange of the rivet. For performing this rivet setting operation, a threaded drift is provided at the end of an inserting shaft which is inserted into a rivet setting tool. The threaded drift of the shaft is screwed into the nut portion of the rivet so as to engage the same and pull the nut in the direction of the wall or sheet. Only the unthreaded sleeve of the cylindrical part of the rivet is compressed into a second flanged collar. The threaded nut of the rivet is unchanged.

Riveting tools may be pneumatically powered or manually powered. Tools designed for blind rivets have a bore into which a shaft is inserted and locked into place. When the riveting tool is activated, the riveting shaft is drawn further into the bore of the riveting tool. In the case of threaded blind rivets, the threaded drift portion of the inserting shaft which is engaged to the nut portion of the rivet is drawn toward the riveting tool. The portion of the riveting tool directly adjacent to the bore into which the shaft is inserted engages the head of the rivet. The portion of the tool engaging the head and the motion of the shaft engaging the nut portion of the rivet causes the action which fixes the rivet by deforming the sleeve portion of the rivet into a flange.

There are a wide variety of different types of riveting tools. All riveting tools designed for use with threaded blind rivets have a bore into which the inserting shaft is to be inserted. These threaded blind rivet inserting tools also have a flat face surrounding the bore designed to engage the head of the rivet. Combination of the newly formed flange and the head of the rivet hold the rivet in position within the hole into which it was inserted. The combination of head and new flange may also be used to hold two or more flat pieces of metal or other material together.

Practically every automobile on the road today has many of these threaded rivets. It has, therefore, become very important for automobile repair shops to be capable of replacing these threaded rivets. Auto repair shops, however, generally do not posess the same type of pneumatic equipment that the manufacturers use to install these threaded rivets. Instead, these repair shops generally use less expensive, hand operated rivet inserting tools. While these hand held tools are significantly less expensive than the equipment used by manufacturers, they are much more difficult to use. Also, hand held rivet insert tools generally do not consistently apply the same amount of pressure to subsequent rivets when inserting them. This inaccuracy decreases the value of the repair work.

Another problem with threaded blind rivet insert tools is that too much force may be applied to the threaded blind rivet. This may result in damage to the threaded nut portion of the rivet. If this occurs the rivet is useless, and often quite difficult to remove from the hole into which it was inserted. At the same time, it is important to apply a sufficient amount of force so that the sleeve portion of the rivet creates an effective flange.

It is also desirable to provide a means of fixing a threaded blind rivet without damaging the nut portion of the rivet.

It is also desirable to provide a means of fixing a blind threaded rivet securely by sufficiently forming a flange.

It is therefore desirable to provide a rivet insert tool that will consistently apply the same force to subsequent inserted rivets.

BRIEF SUMMARY OF THE INVENTION

The present invention combines a threaded rivet insert shaft with a sleeve designed to provide uniformly fixed inserted blind threaded rivets. The combination shaft and sleeve may be used with either pneumatic, air pressure or hand operated rivet inserting tools. The invention securely inserts rivets having a uniform depth into the holes designed to receive the rivets.

The use of threaded insert shafts is well known in the art of threaded rivets. These insert shafts have two ends. One end is comprised of a drift having threading to which a threaded insert is attached. The other end is smooth and unthreaded and designed to attach to a riveting tool. A threaded rivet is threaded onto the drift portion of the shaft. It is threaded onto the shaft in such a way so that the head faces the smooth stem end of the shaft, and the cylindrical portion of the rivet having the sleeve and nut portions of the rivet is on the other side of the head from the smooth stem of the shaft.

Ideally, the tool facing end of the threaded drift of the insert shaft is flush with the point where the sleeve portion of the rivet ends and the nut portion of the rivet begins. Unfortunately, the tool facing end of the threaded drift when flush with the point at which the sleeve portion ends is located within the cylindrical portion of the rivet. This obstructs the view, and makes it very difficult to accurately position the threaded drift. When the rivet is not accurately positioned on the shaft, the rivet may be under or over compressed resulting in either a damaged rivet, or one that is too loose, neither of which is desirable.

The present invention overcomes this difficulty. The rivet inserting shaft is sheathed with a metal sleeve. The metal sleeve has a bore running through it having two different diameters. These two different diameters correspond to the different diameters of the smooth portion of the inserting shaft and the threaded drift portion of the inserting shaft. The larger diameter region of the bore, designed to accommodate both the smooth and threaded drift portions of the shaft has a depth equal to the length of the sleeve portion of the rivet. The remaining, smaller diameter portion of the bore through the sleeve has a diameter large enough to accommodate the smooth stem of the inserting shaft but too small to allow the threaded drift portion of the shaft to enter it.

The smooth stem of the inserting shaft extending out of the smaller diameter portion of the bore in the sleeve is then inserted into a rivet inserting tool. The inserting shaft is inserted as far as possible into the inserting tool, so that the head of the rivet engages one end of the sleeve and the flat face portion of the inserting tool engages the other end of the sleeve. The rivet is then inserted into the hole to which it is to be fixed.

Instead of the user threading the insert onto the shaft guessing at which point the tool facing end of the threaded drift of the shaft is flush with the point at which the nut of the rivet begins, the sleeve automatically measures this distance. The rivet is placed so that the nut portion of the rivet engages the threaded drift portion of the inserting shaft and the rivet head is flush with the tool facing end of the threaded drift portion of the shaft. The sleeve is then placed over the smooth portion of the shaft prior to the smooth portion being inserted into the riveting tool. The depth of the larger portion of the bore hole is greater than the length of the unthreaded sleeve portion of the cylindrical part of the rivet.

The distance to which the inserting shaft is retracted into the inserting tool is determined by the amount of pressure applied to the item by the tool. This prevents overcompression of the rivets which causes damage to the nut portion of the rivet. This also prevents undercompression of the rivets which results in a poor flange. A poor flange causes the rivet to be loose. This makes it ineffective at holding two or more flat surfaces together. This also results in a threaded rivet of poor quality which may be unuseable. A poorly compressed rivet will have to be removed. This can be inconvenient and time consuming.

The present invention also has the significant advantage of being capable of being retrofitted to existing rivet equipment. No additional equipment needs to be acquired in order to add the present invention to existing riveting systems. In addition to being cost efficient, this also makes the invention easy to use. Very little instruction is needed for one skilled in the art of riveting to add to the present invention to existing equipment.

The present invention is relatively easy and inexpensive to manufacture. The low cost and ease of use of the invention makes it highly attractive to those skilled in the art of riveting.

It is therefore an object of the present invention to provide a method for inserting a threaded blind rivet without over-compressing the rivet.

It is another object of the present invention to provide a means of inserting a threaded blind rivet without failing to properly compress said rivet, thereby forming an unuseable rivet.

It is therefore an object of the present invention to provide a reliable method of applying consistent pressure to subsequent inserted rivets.

Another object of the present is to provide an improved tool that may be used with minimal instruction.

Yet another object of the present invention is to provide a system for improving rivet application A related object of the present invention is to improve the consistency of rivet application.

A base object of the present invention is to provide an improved repair tool for use with vehicles or the like.

BRIEF DESCRIPTION OF THE SEVERAL VIEWS OF THE DRAWING

FIG. 3A is a perspective view showing a standard threaded blind rivet and revealing the threading within the nut portion of the rivet, taken generally from the front.

FIG. 3B shows a portion of the smooth interior of the sleeve portion of the rivet.

DETAILED DESCRIPTION OF THE INVENTION

Figure 1:
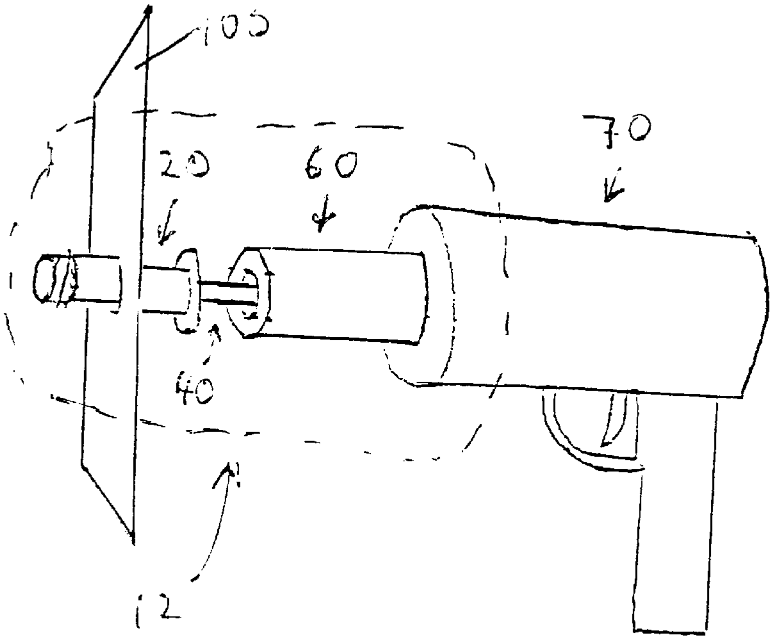
FIG. 1 is an environmental view of an exemplary embodiment of a tool for securing threaded inserts in accordance with the present invention.

Important components of the disclosed invention include the sleeve to be used with the insert tool and its interaction with the threaded insert shaft as well as the remaining items associated therewith. FIG. 1 of the drawings shows an environmental view of an exemplary embodiment of the present invention including sleeve 60 being used in conjunction with an insert tool. FIG. 1 shows the invention being used in conjunction with a standard rivet inserting tool, a threaded blind rivet and a workpiece or planar object 100 having a hole into which the rivet is being inserted. Object 100 can be several objects fastened together or the like. The operation of the invention shown particularly in the encircled section 12 will be discussed in further detail hereinafter. The rivet inserting tool may be powered by pneumatics, hydraulics, electricity or the manual power of the operator.

Figure 2:
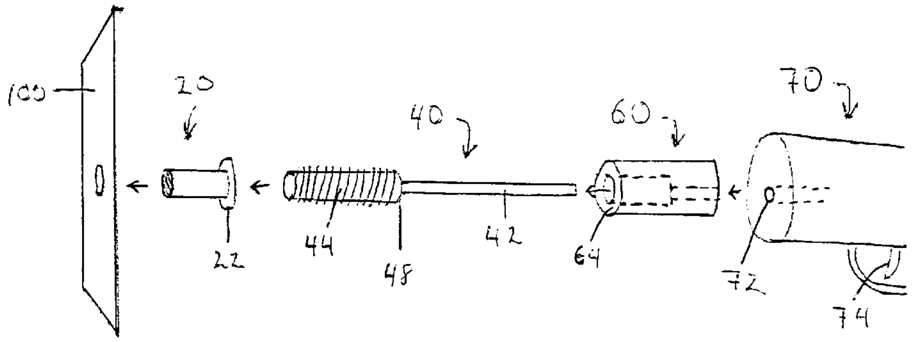
FIG. 2 is an exploded environmental view of the present invention with portions fragmented to the bore through the sleeve having two different diameters with the sleeve shown in the proper orientation

FIG. 2 shows an exploded view similar to FIG. 1. Threaded blind rivet 20 is threaded onto the threaded drift portion of insert shaft 40. The threaded blind rivet is screwed on to the threaded drift 44 of insert shaft 40 until head 22 is flush with tool facing end 48 of threaded drift 44. Sleeve 60 is then slid over the smooth stem 42 of shaft 44 until rivet engaging end 64 is in contact with head 22. Smooth stem 42 of insert shaft 40 is then inserted into slot 72 on rivet insert tool 70. By applying pressure to trigger 74, rivet insert tool 70 is activated.

The present invention may be used with any existing system for inserting threaded blind rivets. It consists of the use of a specially designed sleeve in conjunction with an insert shaft that engages the sleeve in an unusual way.

FIGS. 3A and 3B show a typical threaded blind rivet 20. Rivet 20 is comprised of a single piece of metal that has been molded and machined to have at least three sections. Those skilled in the art will be very familiar with this common type of threaded blind rivet. Head 22 is flat and circular in shape. It has a front tool engaging side 32 and a back object engaging side 30. When inserted into a hole designed to receive the rivet, object engaging side 30 is placed against the planar material into which the hole is cut. Tool engaging side 32 faces toward the tool to be used to compress the sleeve portion. Sleeve section 24 is usually designed so that its walls are thinner than threaded portion 26. This facilitates the compressing of sleeve section 24 into a flange shape. The nut section 26 has interior threading 28. Interior threading 28 of nut section 26 engages the threading of the drift of the inserting shaft. The inserting shaft will be discussed in more detail below. At the end of nut section 26 is insertion side 34. This is the end of the rivet that is inserted into a hole designed to receive it. The rivet is inserted all the way into the hole in the planar object until object engaging side 30 of head 22 is in contact with it. Object engaging side 30 must be firmly pushed against the planar object in order for the rivet to be properly fixed onto the object.

Head 22 will form one of the flanges that will hold the rivet in place. Sleeve section 24 is not threaded on its interior. When the rivet insert tool is activated this portion of the rivet is compressed to form a second flange on the opposite side of a hole from head 22. It is the formation of the second flange from section 24 that secures the rivet firmly in place on workpiece 100. Section 26 has threading on its interior 28. Both before and after the activation of the rivet insert tool section 24 retains its cylindrical shape. It is this portion of the rivet that may engage a screw or bolt. The final shape of section 24 may be seen in FIG. 8.

Figure 4A:
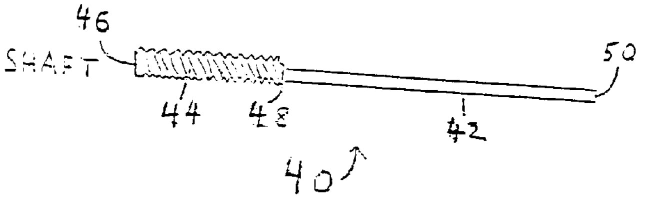
FIG. 4A is an elevational view showing a shaft associated with the present invention.
Figure 4B:
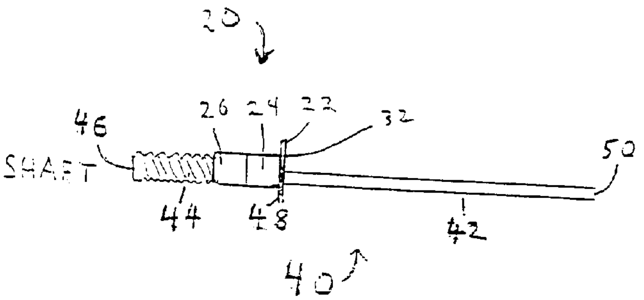
FIG. 4B is an elevational view showing the insert shaft having a threaded blind rivet attached to the threaded drift portion of the shaft and with the rivet properly attached by having the head of the rivet flush with the tool facing portion of the threaded drift and the nut portion of the rivet engaged with the threaded portion of the drift.

FIG. 4 shows insert shaft 40. It is comprised of 2 sections: threaded drift 44 and smooth stem 42. Smooth stem 42 has a significantly smaller diameter than threaded drift 44. The diameter of stem 42 is preferably approximately the same as that of a standard ¼ inch pop rivet stem. Those skilled in the art will recognize that there is a ubiquitous standard diameter size for insert stems. Threaded blind rivet 20 is twisted onto the threaded drift 44 of shaft 40 such that head 22 is flush with the tool facing end of threaded drift 48. By threading the rivet all the way up until head 22 is flush with tool facing end 48, the user insures that all inserted rivets will be uniform with one another. FIG. 4B shows a rivet 20 properly inserted onto insert shaft 40.

Distal end 46 of shaft 40 located at the end of threaded drift 44 is the end of the shaft that will be inserted into the hole in the object to which the rivet will be fixed. Distal end 50 of insert shaft 40 is the end of the shaft inserted into the bore of the insertion tool. When the threaded blind rivet is properly attached to the threaded drift of shaft 40, distal end 46 will protrude out from nut section 26 of rivet 20. Tool facing end 32 of rivet head 22 will be facing the distal end 50 of shaft 40 to be inserted into the insertion tool.

Figures 5A, 5B, 5C:
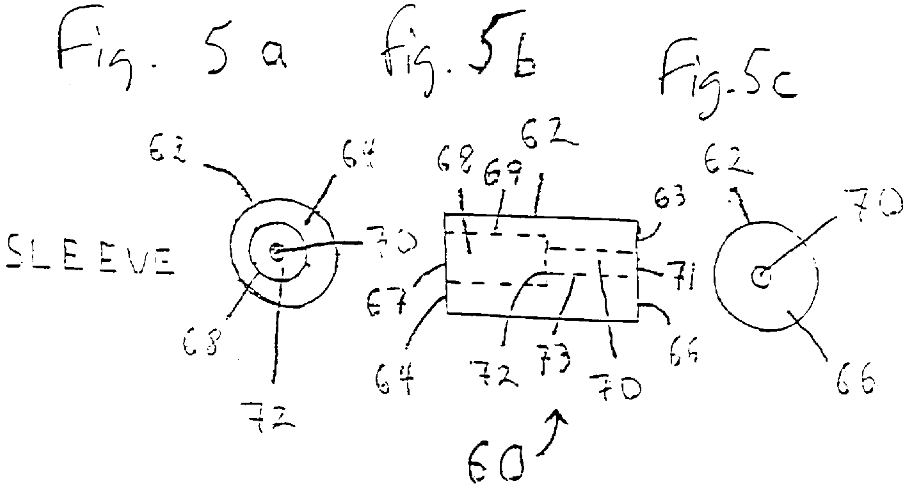
FIG. 5A is a front elevational view showing a sleeve having a bore with multiple internal diameters.
FIG. 5B is a side elevational view thereof with dashed lines indicating the periphery of the internal bore.
FIG. 5C is a back elevational view thereof.
Figure 6:
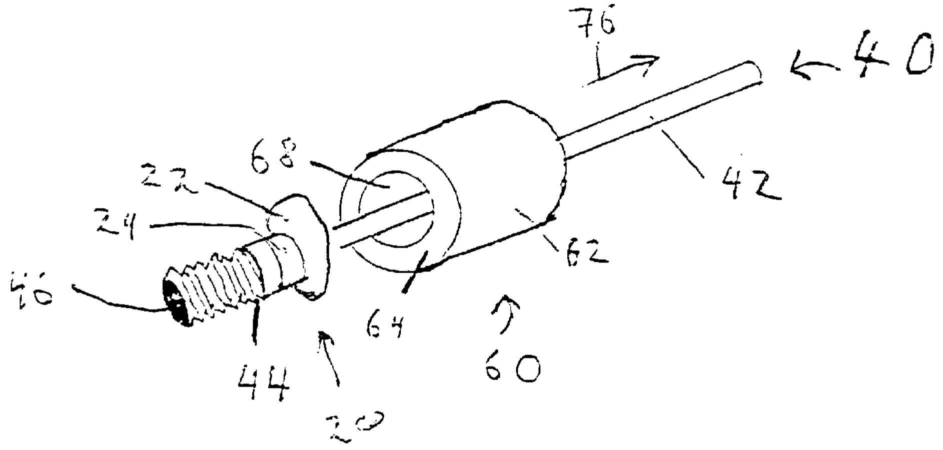
FIG. 6 is a perspective view of the inserting shaft having a blind threaded rivet properly attached and sheathed by the sleeve.

FIGS. 5A–5C show other views of sleeve 60. Sleeve 60 has a tool engaging end 66 and a rivet engaging end 64. Large bore 68 extends from the rivet engaging ends 64 to a fixed distance through the sleeve 60. Large bore 68 has a diameter that is slightly larger than the threaded portion 44 of shaft 40. Small bore 70 extends from the tool facing end 66 of sleeve 60 to the end 72 of large bore 68. Small bore 70 has a diameter that is slightly larger than smooth stem 42 of insert shaft 40.

Large bore 68 has a length 69 and a diameter 67. Length 69 is greater than to the length of the sleeve portion of rivet 20. Diameter 67 is slightly greater than the diameter of the threaded drift of shaft 40. Smaller bore 70 also has a length 73 and diameter 71. Diameter 71 is slightly larger than the diameter of the smooth portion of shaft 40. Length 73 may vary, depending on the length of smooth portion 42 of shaft 40, and the distance into which smooth portion 42 must be inserted into insert tool bore 72. If bore length 73 is too long, there will not be enough of smooth portion 42 of shaft 40 extending out of it to properly engage the inserting tool 70.

Figure 7:
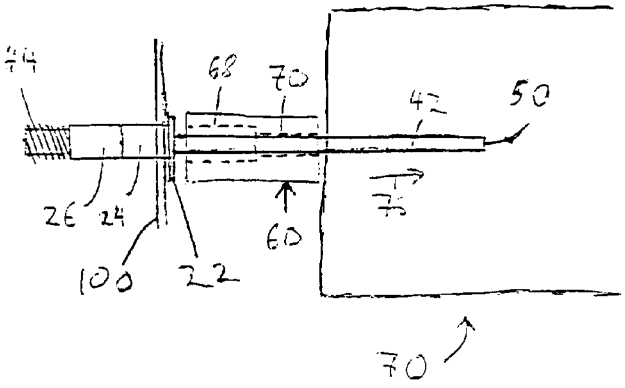
FIG. 7 is an enlarged view of the encircled portion of FIG. 1. Showing the positioning of the insert shaft, insert tool, sleeve, flat material and rivet prior to activation of the insert tool.

FIG. 7 shows rivet 20 in place on threaded portion 44 of shaft 40. First flange 22 is flush with central end 48 of threaded portion 44. Rivet 20 is inserted into a hole in planar object 100. Activation of tool 70 causes shaft 40 to move in the direction of directional arrow 76. Sleeve 60 remains unmoved relative to tool 70 and planar object 100.

Figure 8:
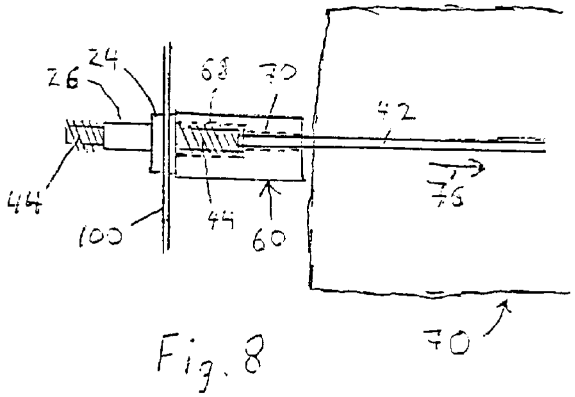
FIG. 8 is an enlarged view of the encircled portion of FIG. 1 and similar to FIG. 7 but showing the sleeve position compressed into a threaded drift portion of the shaft that has been moved into the large diameter portion of the bore through the sleeve.

FIG. 8 shows results of activation of tool 70. After shaft 40 has been drawn into insert tool 70, shaft 40 is released from insert tool 70. The sleeve may or may not then be removed from shaft 40. Shaft 40 is then unscrewed from threaded rivet 20. As can be seen in FIG. 8, collapsing portion 24 has been collapsed to form a second flange.

Whereas, the present invention has been described in relation to the drawings attached hereto, it should be understood that other and further modifications, apart from those shown or suggested herein, may be made within the spirit and scope of this invention.

What is claimed is:

1. A method for inserting a rivet into a work piece comprising:

attaching a rivet to the end of an inserting shaft, the rivet comprising a flat circular head, a sleeve section and a nut section, the nut section having threading on its inside, and the inserting shaft having a threaded drift section that engages the inside of the nut section;

drawing said inserting shaft through a sleeve;

inserting a portion of said inserting shaft into a rivet inserting tool, such that said sleeve is located between said rivet and said rivet inserting tool;

inserting said rivet into a hole in a workpiece;

activating said rivet inserting tool thereby fixing said rivet into said workpiece; and, removing said inserting shaft from said rivet.

2. A method for inserting threaded blind rivets comprising:

attaching a threaded blind rivet to a threaded drift of an inserting shaft, the rivet comprising a flat circular head, a sleeve section and a nut section, the nut section having threading on its inside, and said inserting shaft having a threaded drift and a smooth stem;

drawing said smooth stem of said inserting shaft through a sleeve having a bore through it;

attaching said smooth stem of said inserting shaft into a rivet inserting tool, such that the sleeve is located between said rivet inserting tool and said threaded blind rivet;

inserting said rivet into a hole in a workpiece;

activating said rivet inserting tool thereby fixing said rivet into said workpiece; and, removing said inserting shaft from said rivet.

3. The method of claim 2, wherein said rivet is attached to said threaded drift such that the head of said rivet is flush with a point where said threaded drift joins with said smooth stem.

4. A method according to claim 2, wherein said threaded drift has a diameter of approximately 0.25 inches and a length of 1 inch and said smooth stem of said inserting shaft has a diameter of 0.15 inches and a length of 2.25 inches.

5. The method of claim 2, wherein one portion of said bore has a diameter of approximately 0.255 inches and is 0.550 inches long, and the second portion of said bore has a diameter of 0.155 inches.

6. An apparatus for inserting a threaded blind rivet comprising:

a rivet inserting tool;

an inserting shaft, said inserting shaft comprising a threaded drift and a smooth stem portion; and, a sleeve having a bore comprised of a large diameter section and a small diameter section, the large diameter section large enough to accommodate the threaded drift of the inserting shaft capable of engaging the flanged head portion of a threaded blind rivet.

7. The apparatus of claim 6, wherein said bore of said sleeve is comprised of a large diameter section and a small diameter section.

8. The apparatus of claims 6, wherein said large diameter section has a diameter of approximately 0.255 inches and is 0.550 inches long, and said small diameter section has a diameter of 0.155 inches.

9. The apparatus of claim 6, wherein said threaded drift is 1 inch long and said smooth portion has a diameter of 0.150 inches and is 2.25 inches long.

* * * * *